(12) United States Patent
Gandhi et al.

(10) Patent No.: US 12,401,397 B2
(45) Date of Patent: Aug. 26, 2025

(54) DATA TRANSFER INTERFACE FOR IN-PHASE AND QUADRATURE (I/Q) DATA

(71) Applicant: MaxLinear, Inc., Carlsbad, CA (US)

(72) Inventors: Sameer Madhav Gandhi, Karnataka (IN); Praveen Ghanashyam Shekokar, Karnataka (IN); Subramanian Anantharaman Chandrasekarapuram, Karnataka (IN); Prasenjit Bhowmik, Karnataka (IN)

(73) Assignee: MaxLinear, Inc., Carlsbad, CA (US)

( * ) Notice: Subject to any disclaimer, the term of this patent is extended or adjusted under 35 U.S.C. 154(b) by 233 days.

(21) Appl. No.: 17/807,728

(22) Filed: Jun. 19, 2022

(65) Prior Publication Data

US 2022/0407567 A1 Dec. 22, 2022

(30) Foreign Application Priority Data

Jun. 18, 2021 (IN) .............................. 202111027376

(51) Int. Cl.
*H04B 1/00* (2006.01)
*H04B 1/38* (2015.01)
*H04B 1/66* (2006.01)
*H04B 7/0426* (2017.01)

(52) U.S. Cl.
CPC .............. *H04B 7/043* (2013.01); *H04B 1/38* (2013.01); *H04B 1/662* (2013.01)

(58) Field of Classification Search
CPC .......... H04B 7/043; H04B 1/38; H04B 1/662; H04B 7/0617
USPC ..................................................... 455/552.1
See application file for complete search history.

(56) References Cited

U.S. PATENT DOCUMENTS

| | | | |
|---|---|---|---|
| 9,148,325 B2 * | 9/2015 | Hamila | H04L 27/3863 |
| 11,831,579 B2 * | 11/2023 | Rajagopal | H04W 92/02 |
| 2018/0262994 A1 | 9/2018 | Park et al. | |
| 2019/0167235 A1 | 6/2019 | Freeman et al. | |
| 2019/0173568 A1 | 6/2019 | Jalali | |
| 2020/0045610 A1 | 2/2020 | Shih et al. | |
| 2021/0058925 A1 | 2/2021 | Shim et al. | |

(Continued)

FOREIGN PATENT DOCUMENTS

| | | | | |
|---|---|---|---|---|
| IT | 202100014903 A1 * | 12/2022 | | H04B 7/0695 |
| WO | WO-2022005709 A1 * | 1/2022 | | H04L 69/04 |

OTHER PUBLICATIONS

International Search Report and Written Opinion in PCT/US22/73041 mailed Sep. 23, 2022.

*Primary Examiner* — Tanmay K Shah
(74) *Attorney, Agent, or Firm* — Buchalter; Jason W. Croft (57) ABSTRACT

A system for a radio access network (RAN) includes a radio unit (RU) configured to receive first in-phase and quadrature (I/Q) data represented in a first domain from a distributed unit (DU). The system includes a beamformer associated with the RU. The beamformer is configured to receive the first I/Q data represented in the first domain. The beamformer is also configured to transmit second I/Q data represented in the first domain based on the first I/Q data in the first domain. The system also includes a transceiver associated with the RU. The transceiver is configured to receive the second I/Q data represented in the first domain. The transceiver is also configured to convert the second I/Q data represented in the first domain to second I/Q data represented in a second domain.

19 Claims, 8 Drawing Sheets

(56) References Cited

U.S. PATENT DOCUMENTS

| | | |
|---|---|---|
| 2021/0120527 A1 | 4/2021 | Rhim et al. |
| 2021/0167996 A1* | 6/2021 | Ratnam ................ H04B 7/0617 |
| 2022/0014326 A1* | 1/2022 | Lourdu Raja ......... H04L 5/0048 |
| 2022/0086890 A1* | 3/2022 | Kim ...................... H04W 72/23 |

* cited by examiner

DATA TRANSFER INTERFACE FOR IN-PHASE AND QUADRATURE (I/Q) DATA

CROSS REFERENCE TO RELATED APPLICATIONS

This U.S. patent application claims priority to Indian Provisional Patent Application 202111027376 filed in India on Jun. 18, 2021. The disclosure of this prior application is considered part of the disclosure of this application and is hereby incorporated by reference in its entirety.

TECHNICAL FIELD

This disclosure relates to a system for a radio access network (RAN).

BACKGROUND

Data communication (e.g., I/Q data transmission) between various systems with radios may include bandwidth limitations. In some circumstances, increasing the number of radios (e.g., number of antenna) in the system may add to the bandwidth limitations and may also introduce issues related to timing synchronization between the radios. The subject matter claimed in the present disclosure is not limited to embodiments that solve any disadvantages or that operate only in environments such as those described above. Rather, this background is only provided to illustrate one example technology area where some embodiments described in the present disclosure may be practiced.

SUMMARY

One aspect of the disclosure provides a system for a radio access network (RAN). The system includes a radio unit (RU) configured to receive first in-phase and quadrature (I/Q) data represented in a first domain from a distributed unit (DU). The system also includes a beamformer associated with the radio unit (RU). The beamformer is configured to receive the first in-phase and quadrature (I/Q) data represented in the first domain. The beamformer is also configured to transmit second in-phase and quadrature (I/Q) data represented in the first domain based on the first in-phase and quadrature (I/Q) data in the first domain. The system also includes a transceiver associated with the radio unit (RU). The transceiver is configured to receive the second in-phase and quadrature (I/Q) data represented in the first domain. The transceiver is also configured to convert the second in-phase and quadrature (I/Q) data represented in the first domain to second in-phase and quadrature (I/Q) data represented in a second domain.

Implementations of the disclosure may include one or more of the following optional features. In some implementations, the first domain is a frequency domain, and the second domain is a time domain. In some implementations, the first in-phase and quadrature (I/Q) data in the first domain and the second in-phase and quadrature (I/Q) data in the first domain are the same. In some implementations, the beamformer is configured to process the first in-phase and quadrature (I/Q) data represented in the first domain with a data compression scheme. For example, the data compression scheme includes at least one open radio access network (O-RAN) compression scheme.

Optionally, the beamformer and the transceiver are further configured such that the second in-phase and quadrature (I/Q) data represented in the first domain is transmitted from the beamformer to the transceiver based on an Ethernet standard or a JESD standard. In some implementations, the transceiver includes an inverse fast fourier transform (IFFT) module (including an IFFT/FFT module) configured to convert the second in-phase and quadrature (I/Q) data represented in the first domain to the second in-phase and quadrature (I/Q) data represented in the second domain. In some implementations, the radio unit (RU) is an open radio unit (O-RU). In some implementations, the distributed unit (DU) is an open distributed unit (O-DU).

Another aspect of the disclosure provides a system for a radio access network (RAN). The system includes a radio unit (RU) configured to receive a first in-phase and quadrature (I/Q) signal represented in a first domain from a distributed unit (DU). The system also includes a beamformer associated with the radio unit (RU). The beamformer is configured to receive the first in-phase and quadrature (I/Q) signal represented in the first domain. The beamformer is also configured to transmit a plurality of second in-phase and quadrature (I/Q) signals represented in the first domain based on the first in-phase and quadrature (I/Q) signal represented in the first domain. The plurality of second in-phase and quadrature (I/Q) signals represented in the first domain includes a #1 second in-phase and quadrature (I/Q) signal represented in the first domain and a #2 second in-phase and quadrature (I/Q) signal represented in the first domain. The system also includes a plurality of transceivers associated with the radio unit (RU). The plurality of transceivers includes a first transceiver and a second transceiver. The first transceiver is configured to receive the #1 second in-phase and quadrature (I/Q) signal represented in the first domain. The first transceiver is also configured to convert the #1 second in-phase and quadrature (I/Q) data represented in the first domain to a #1 second in-phase and quadrature (I/Q) data represented in a second domain. The second transceiver is configured to receive the #2 second in-phase quadrature (I/Q) signal represented in the first domain. The second transceiver is configured to convert the #2 second in-phase and quadrature (I/Q) data represented in the first domain to a #2 second in-phase and quadrature (I/Q) data represented in the second domain.

Implementations of the disclosure may include one or more of the following optional features. In some implementations, the first domain is a frequency domain, and the second domain is a time domain. In some implementations, the beamformer is configured to process the first in-phase and quadrature (I/Q) signal represented in the first domain with a signal compression scheme. For example, the signal compression scheme includes at least one of open radio access network (O-RAN) compression schemes.

Optionally, the beamformer and the first transceiver are further configured such that the #1 second in-phase and quadrature (I/Q) signal represented in the first domain is transmitted from the beamformer to the first transceiver based on an Ethernet standard or a JESD standard, and wherein the beamformer and the second transceiver are further configured such that the #2 second in-phase and quadrature (I/Q) signal represented in the first domain is transmitted from the beamformer to the second transceiver based on the Ethernet standard or the JESD standard. In some implementations, the first transceiver includes a first inverse fast fourier transform (IFFT) module that is configured to convert the #1 second in-phase and quadrature (I/Q) signal represented in the first domain to the #1 second in-phase quadrature (I/Q) signal represented in the second domain. In some implementations, the second transceiver includes a second inverse fast fourier transform (IFFT)

module that is configured to convert the #2 second in-phase quadrature (I/Q) signal represented in the first domain to the #2 second in-phase quadrature (I/Q) signal represented in the second domain.

In some implementations, the system further includes a first front end module (FEM) configured to generate a first output signal based on the #1 second in-phase quadrature (I/Q) data represented in the second domain, and a second front end module (FEM) configured to generate a second output signal based on #2 second in-phase quadrature (I/Q) data represented in the second domain. In some implementations, the system further includes a delay estimator configured to compare the first output and the second output. In some implementations, the delay estimator is further determine a time delay between the first output and the second output. In some implementations, one of the first transceiver and the second transceiver includes the delay estimator.

DESCRIPTION OF DRAWINGS

Example implementations will be described and explained with additional specificity and detail through the use of the accompanying drawings in which.

Like reference symbols in the various drawings indicate like elements.

DETAILED DESCRIPTION

In a Massive Multiple-Input Multiple-Output (mMIMO) system, a beamformer (e.g., beam forming chip, beam forming circuit, beam forming circuitry) in the mMIMO system may interface with multiple transceivers. The beamformer is configured to send or transmit in-phase and quadrature (I/Q) samples (also referred as I/Q data, I/Q sample sequences, I/Q signals) in time domain to one or more of the transceivers (e.g., transmitters). Typically, the time domain I/Q samples transmitted from the beamformer to the one or more of the transceivers are required to include cyclic prefix (CP) and guard period. The cyclic prefix and guard period make up a significant amount of data in the time domain I/Q samples.

In some circumstances, a separate timing reference signal may be sent to all of the transceivers that may be used for synchronization. In some circumstances, the timing reference signal may include narrow timing constraints. The narrow timing constraints may be implemented by controlling the timing reference signals in the individual transceivers. In some circumstances, controlling the timing reference signals may introduce additional complexity to the mMIMO system in terms of board design.

The present disclosure includes implementations of a frequency domain interface that may enable a reduction on the bandwidth requirement of the interface between the beamformer and the transceivers. Further, a method to synchronize multiple such transceivers in a mMIMO system to a very high accuracy with reduced complexity in the system is included.

In some circumstances, implementations of the present disclosure may facilitate a greater availability of bandwidth relative to conventional data transfer systems. Alternatively or additionally, implementations of the present disclosure may facilitate a reduced number of lanes (e.g., links) included in the system. The reduced number of lanes may further indicate a fewer number of interfaces within the system and/or fewer pins in the system. Alternatively or additionally, implementations of the present disclosure may facilitate the use of smaller chips and/or boards which may result in reduced costs and/or materials relative to conventional data transfer systems. These features can lead to reduce power dissipation as well.

The present disclosure may implement fast fourier transform (FFT) modules, inverse fast fourier transform (IFFT) modules, and physical random access channel (PRACH) modules inside a transceiver which may reduce the load on the beamformer. In some circumstances, a 30-70% reduction in serial rate may be achieved. In some circumstances, physical resource blocks (PRB) instead of time domain I/Q samples may be employed. Alternatively or additionally, the CP may not be transferred over the link. Further, in circumstances in which the frequency domain interface is selected, standard O-RAN compression schemes may be utilized. In these and other implementations, implementation of a beamformer interface via Ethernet may be an alternative to the JESD time domain interface (e.g., digital up converter (DUC) digital down converter (DDC) time interface) that is presently supported. The JESD is an interface standard established by the Joint Electron Devices Engineering Council.

In some implementations, the beamformer may provide a function of O-RAN termination (which may include termination of the C-plane, U-plane, M-plane, and/or the S-plane). In some implementations, the beamformer may provide beam forming actuation. Alternatively or additionally, the beamformer may provide a clock signal (e.g., 491.52 MHz DEV_CLK where 1588 may be recovered clock). In some embodiments, the beamformer may be configured to distribute the time of day (ToD) signal to various transceiver. In some implementations, the beamformer may include a 156.25 MHz Ethernet clock which may include up to 100 ppm offset. In some instances, the Ethernet clock may not be a SyncE derived clock. In some implementations, the beamformer may provide mini distributed unit (DU) functionality for data and/or control. The mini DU functionality may include a subset of C-plane messages for time-division duplexing (TDD) control and/or may utilize the U-plane for frequency domain I/Q transfer.

In some implementations, the mini DU may be configured to obtain frequency domain I/Q samples in O-RAN U-plane format. For example, the MIMO layer data from DU (e.g., Open DU, O-DU) may be extracted and beam formed where the individual antenna streams may be re-packetized into multiple antenna stream packets. In some embodiments, the antenna streams may be compressed using ORAN compression schemes to improve a data rate between a beamformer and the transceivers. In some implementations, the mini DU may be configured to support simple C-plane messages. The simple C-plane messages may include a type message with section IDs. For example, in an ORAN context, the simple C-plane messages may include a section type 1 message with 1 section ID (e.g., radio unit may internally translate them to RXEN and/or TXEN), section type 3 message (e.g., schedule PRACH), and/or section type 0 message (e.g., silence period, DTX support). In some implementations, the mini DU may include an internet protocol (IP) socket layer for non-real time control and management of the transceiver. In some implementations, the mini DU may be configured to use application programing interface (API) based communication with each transceiver via "IP socket over ethernet" or (serial peripheral interface) SPI. For example, the communication over ethernet may allow faster code downloads and additional bandwidth at start-up, which may allow for a faster configuration. In some implementations, the IP socket layer may be configured to manage the C/U-plane initialization and/or the M-plane functionality. Alternatively or additionally, the IP socket layer may be configured to capture faults and/or event via interrupt from the transceivers and call back APIs.

In some implementations, the ToD may be distributed by a beamformer in at least two different options. The first option may include implementing a SYNC message from fronthaul (FH) ethernet to distribute the ToD. For example, the first option may use a precision time protocol (PTP) SYNC message to convey the ToD by the beamformer to each transceiver. Alternatively or additionally, the first option may be used by the beamformer to calibrate various latencies to achieve +/–10 ns ToD accuracy. The second option may include using serial peripheral interface-slave (SPI-S IF) to transfer the ToD. The second option may use the SPI-S to program the ToD corresponding to the next pulse-per-second (PPS) event. The PPS may be synchronous to DEV_CLK (e.g., 491.52 MHz). In instances in which the ToD is configured, the ToD may be loaded on the next PPS event. In either option, the start-up antenna calibration may be used to achieve approximately 100 ps accuracy. In instances in which there are coarse errors (e.g., errors of greater than 2 ns), the ToD distribution may implement the ToD offset in digital.

In some implementations, the transceivers may include low physical layer (LPHY) devices. For example, the transceivers may include IFFT module, DUC, crest factor reduction/digital pre-distortion (CFR/DPD) module on the downlink (DL). Alternatively or additionally, the transceivers may include DDC, FFT module, and PRACH module on the uplink (UL). In some implementations, the transceivers may include PA protection, IQ, LOFT, and/or gain calibration. Alternatively or additionally, the transceivers may include automatic gain control (AGC) functionality, which may include a constant gain pipe at a component carrier level with adjustable set points. A plurality of carriers (e.g., component carriers) are also included. In some implementations, the transceivers may include O-RAN compliant antenna calibration that may be set up via SPI in advance. Additionally, Time Division Duplex (TDD) frames and/or TDD patterns may be set up in advance. In some implementations, the transceivers may include delay adjustments during start-up calibration, which may include accurate (e.g., less than 50 ps) delay alignment across the transceivers.

The present disclosure provides methods to transfer frequency domain I/Q data to a transceiver in mMIMO systems. Existing systems use a time domain interface which has overhead in terms of bandwidth and hence drives the interface serial link data rate higher which in turn increases the power dissipation in mMIMO systems. Existing mMIMO systems uses a reference signal to synchronize various transceiver in a system which has strict timing requirements and needs careful board design and complicated controls. This present disclosure methods for transferring frequency domain I/Q samples with up to 50% lower bandwidth requirement on the interface serial link. This present disclosure also provides a method to synchronize multiple transceiver in a mMIMO system to a very high accuracy.

The disclosed architecture, apparatus, and methods may be implemented on an integrated circuit (IC). Some or all of the functional blocks (or modules) can be implemented in a single IC, for example, on a single substrate. Alternatively, one or more functional blocks (or modules) can be implemented on a plurality of substrates, and the plurality of substrates can be implemented in one or more ICs.

However, the applicability of the disclosed architecture, apparatus, and methods are not limited to any particular application.

Figure 1:
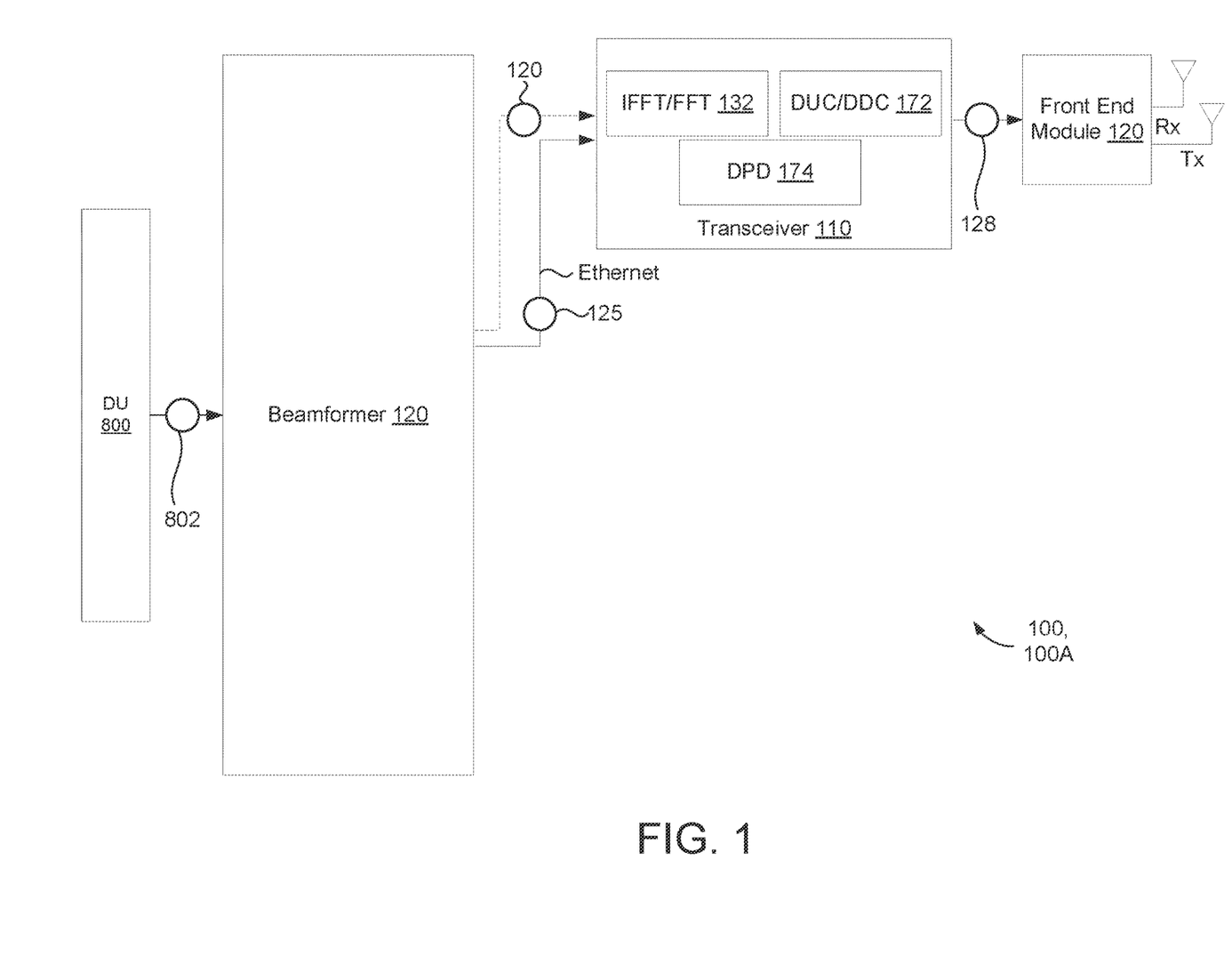
FIG. 1 is a schematic view of an example radio unit (RU) associated with a beamformer and a transceiver.

FIG. 1 is a schematic view of an example radio unit (RU) 100, 100A associated with a beamformer 110 and a transceiver 130. In some implementations, the radio unit (RU) 100A is configured to receive first in-phase and quadrature (I/Q) data represented in a first domain 802 (e.g., frequency domain I/Q data) from a distributed unit (DU) 800.

In some implementations, a beamformer 110, associated with the radio unit (RU) 100A, is configured to receive the first in-phase and quadrature (I/Q) data represented in the first domain 802 and further configured to transmit second in-phase and quadrature (I/Q) data represented in the first domain 125 (e.g., frequency domain I/Q data) based on the first in-phase and quadrature (I/Q) data in the first domain 802. In some implementations, the transceiver 130 is configured to receive the second in-phase and quadrature (I/Q) data represented in the first domain 125 from the beamformer 110 and further configured to convert the second in-phase and quadrature (I/Q) data represented in the first domain 125 to second in-phase and quadrature (I/Q) data represented in a second domain 128 (e.g., time domain I/Q data). In some implementations, the first domain is a frequency domain, and the second domain is a time domain. In some implementations, the first in-phase and quadrature (I/Q) data in the first domain 802 and the second in-phase and quadrature (I/Q) data in the first domain 125 are the same. In some implementations, the radio unit (RU) 100A is an open radio unit (O-RU). In some implementations, the distributed unit (DU) 800 is an open distributed unit (O-DU).

In some implementations, the beamformer 110 is configured to process the first in-phase and quadrature (I/Q) data represented in the first domain 802 with a data compression scheme (e.g., O-RAN data compression scheme) and further configured to transmit the second in-phase and quadrature (I/Q) data represented in the first domain 125 based on the processed first in-phase and quadrature (I/Q) data represented in the first domain 802. In other words, the second in-phase and quadrature (I/Q) data represented in the first domain 125 may include a compressed version (or copy) of the first in-phase and quadrature (I/Q) data represented in the first domain 802. In some implementations, the data compression scheme includes a suitable data compression scheme or a combination of multiple data compression schemes. For example, the suitable data compression scheme includes at least one O-RAN data compression scheme.

In some implementations, the beamformer 110 and the transceiver 130 are configured such that the second in-phase and quadrature (I/Q) data represented in the first domain 125 is transmitted from the beamformer 110 to the transceiver 130 based on an Ethernet standard (e.g., Flexible Data-rate (FD) Ethernet 9 bit, FD Ethernet 12 bit, FD Ethernet 16 bit) as illustrated in FIG. 1. In some implementations, the beamformer 110 is configured to send timing information packets over the Ethernet to the transceiver 130. In some implementations, the transceiver 130 is configured to use the timing information as a timing reference (e.g., initial timing reference).

In some implementations, the beamformer 110 and the transceiver 130 are configured such that the second in-phase and quadrature (I/Q) data represented in the first domain 125 is transmitted from the beamformer 110 to the transceiver 130 based on a JESE standard (e.g., JESD 204A, JESD 204B, JESD 204C).

As illustrated in FIG. 1, in some implementations, the transceivers 130 includes an inverse fast fourier transform/fast fourier transform (IFFT/FFT) module 132 configured to convert the second in-phase quadrature (I/Q) data represented in the first domain 125 to the second in-phase and quadrature (I/Q) data represented in the second domain 128.

As illustrated in FIG. 1, in some implementations, the transceivers 130 includes a digital up converter/digital down converter (DUC/DDC) module 172 and a digital pre-distortion (DPD) module 174.

In some implementations, the transceiver 130 is configured to support control information transmitted from the beamformer 110. For example, the beamformer 110 may communicate various functional modes to the transceivers 130 (e.g., antenna calibration, voltage standing wave ratio (VSWR) calibration). In some implementations, the same may also be sent over a low frequency interface between the beamformer 110 and the transceiver 130.

As illustrated in FIG. 1, in some implementations, the transceivers 130 is configured to transmit the second in-phase and quadrature (I/Q) data represented in the second domain 128 to a front end module 150. In some implementations, the front end modules 150 is configured to provide the final stages of signal amplification when the transceiver 130 is performing the transmission.

Figure 2:
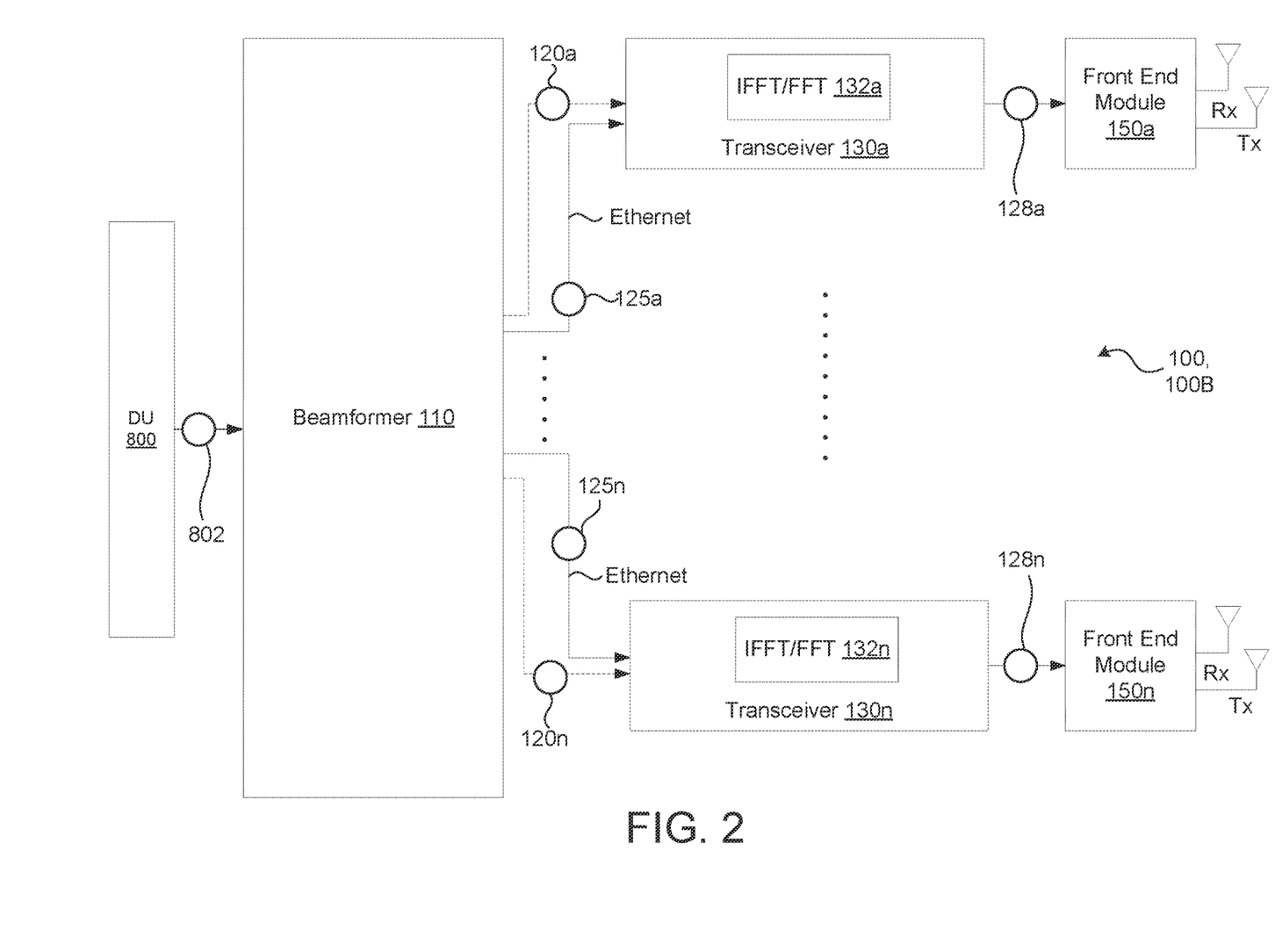
FIG. 2 is a schematic view of an example radio unit (RU) associated with a beamformer and a plurality of transceivers.

FIG. 2 is a schematic view of an example radio unit (RU) 100, 100B associated with a beamformer 110 and a plurality of transceivers 130, 130a-n. In this present example, the beamformer 110 is associated with eight transceivers 130. However, the present disclosure does not limit the number of transceivers 130 associated with the beamformer 110. For example, in some implementations, more than eight transceivers 130 are associated with the beamformer 110. In some implementations, less than eight transceivers 130 are associated with the beamformer 110. Although not shown in FIG. 2 and other FIGS, in some implementations, the transceivers 130 includes a digital up converter/digital down converter (DUC/DDC) module 172 and a digital pre-distortion (DPD) module 174.

In some implementations, the radio unit (RU) 100B is configured to receive first in-phase and quadrature (I/Q) signal represented in a first domain 802 (e.g., frequency domain I/Q signal) from a distributed unit (DU) 800. In some implementations, a beamformer 110 associated with the radio unit (RU) 100B is configured to receive the first in-phase and quadrature (I/Q) signal represented in the first domain 802 and further configured to transmit a plurality of second in-phase and quadrature (I/Q) signals represented in the first domain 125, 125a-n (e.g., frequency domain I/Q data) based on the first in-phase and quadrature (I/Q) signal in the first domain 802.

In some implementations, the transceivers 130a-n are configured to receive the second in-phase and quadrature (I/Q) signals represented in the first domain 125a-n from the beamformer 110 and further configured to convert the second in-phase and quadrature (I/Q) signals represented in the first domain 125a-n to second in-phase and quadrature (I/Q) signals represented in a second domain 128, 128a-n (e.g., time domain I/Q data). For example, a first transceiver 130a is configured to receive the second in-phase and quadrature (I/Q) signal represented in the first domain 125a (i.e., #1 second in-phase and quadrature (I/Q) signal represented in the first domain) from the beamformer 110 and further configured to convert the second in-phase and quadrature (I/Q) signal represented in the first domain 125a to second in-phase and quadrature (I/Q) signal represented in the second domain 128a (e.g., time domain I/Q data). Likewise, the $n^{th}$ transceiver 125n is configured to receive the second in-phase and quadrature (I/Q) signal represented in the first domain 125n (i.e., #n second in-phase and quadrature (I/Q) signal represented in the first domain) from the beamformer 110 and further configured to convert the second in-phase and quadrature (I/Q) signal represented in the first domain 125n to second in-phase and quadrature (I/Q) signal represented in the second domain 128n (e.g., time domain I/Q data). In some implementations, the first domain is a frequency domain, and the second domain is a time domain. In some implementations, the first in-phase and quadrature (I/Q) signal in the first domain 802 and the plurality of the second in-phase and quadrature (I/Q) signals in the first domain 125a-n are the same. In some implementations, the radio unit (RU) 100B is an open radio unit (O-RU). In some implementations, the distributed unit (DU) 800 is an open distributed unit (O-DU).

In some implementations, the beamformer 110 is configured to process the first in-phase and quadrature (I/Q) signal represented in the first domain 802 with a signal compression scheme (e.g., O-RAN data compression scheme) and further configured to transmit the second in-phase and quadrature (I/Q) signals represented in the first domain 125, 125a-n based on the processed first in-phase and quadrature (I/Q) signal represented in the first domain 802. In other words, the second in-phase and quadrature (I/Q) signals represented in the first domain 125a-n may include a compressed version (or copy) of the first in-phase and quadrature (I/Q) signal represented in the first domain 802. In some implementations, the data compression scheme includes a suitable data compression scheme or a combination of multiple data compression schemes. For example, the suitable data compression scheme includes at least one O-RAN data compression scheme.

In some implementations, the beamformer 110 and the transceivers 130a-n are configured such that the second in-phase and quadrature (I/Q) signals represented in the first domain 125a-n are transmitted from the beamformer 110 to the transceivers 130a-n based on an Ethernet standard (e.g., Flexible Data-rate (FD) Ethernet 9 bit, FD Ethernet 12 bit, FD Ethernet 16 bit) as illustrated in FIG. 2. For example, the beamformer 110 and the first transceiver 130a are configured such that the second in-phase and quadrature (I/Q) signal represented in the first domain 125a (i.e., #1 second in-phase and quadrature (I/Q) signal represented in the first domain) is transmitted from the beamformer 110 to the first transceiver 130a based on the Ethernet standard. Likewise, the beamformer 110 and the n$^{th}$ transceiver 130n are configured such that the second in-phase and quadrature (I/Q) signal represented in the first domain 125n (i.e., #n second in-phase and quadrature (I/Q) signal represented in the first domain) is transmitted from the beamformer 110 to the n$^{th}$ transceiver 130n based on the Ethernet standard. In some implementations, the beamformer 110 is configured to send timing information packets over the Ethernet to the transceivers 130a-n. The transceivers 130a-n may be configured to use the timing information as a timing reference (e.g., initial timing reference).

In some implementations, the beamformer 110 and the transceivers 130a-n are configured such that the second in-phase and quadrature (I/Q) signals represented in the first domain 125a-n are transmitted from the beamformer 110 to the transceivers 130a-n based on a JESD standard (e.g., JESD 204A, JESD 204B, JESD 204C). For example, the beamformer 110 and the first transceiver 130a are configured such that the second in-phase and quadrature (I/Q) signal represented in the first domain 125a (i.e., #1 second in-phase and quadrature (I/Q) signal represented in the first domain) is transmitted from the beamformer 110 to the first transceiver 130a based on the JESD standard. Likewise, the beamformer 110 and the n$^{th}$ transceiver 130n are configured such that the second in-phase and quadrature (I/Q) signal represented in the first domain 125n (i.e., #n second in-phase and quadrature (I/Q) signal represented in the first domain) is transmitted from the beamformer 110 to the n$^{th}$ transceiver 130n based on the JESD standard.

As illustrated in FIG. 2, in some implementations, each of the transceivers 130a-n includes an inverse fast fourier transform/fast fourier transform (IFFT/FFT) module 132, 132a-n configured to convert the second in-phase quadrature (I/Q) signals represented in the first domain 125a-n to the second in-phase and quadrature (I/Q) signals represented in the second domain 128a-n.

In some implementations, each of the transceivers 130a-n is configured to support control information transmitted from the beamformer 110. For example, the beamformer 110 may communicate various functional modes to the plurality of transceivers 130a-n (e.g., antenna calibration, voltage standing wave ratio (VSWR) calibration). In some implementations, the same may also be sent over a low frequency interface between the beamformer 110 and the plurality of transceivers 130a-n. In some implementations, the beamformer 110 is configured to provide clock signals 120, 120 a-n (e.g., DEV_CLK 491.52 MHz) to the transceivers 130a-n so all of the transceivers 130a-n are able to operate in a synchronous fashion.

As illustrated in FIG. 2, in some implementations, each of transceivers 130a-n is configured to transmit the second in-phase and quadrature (I/Q) signals represented in the second domain 128a-n to a corresponding front end module 150, 150a-n. In some implementations, the front end modules 150a-n are configured to provide the final stages of signal amplification when the transceivers 130a-n are performing the transmission.

Figure 3:
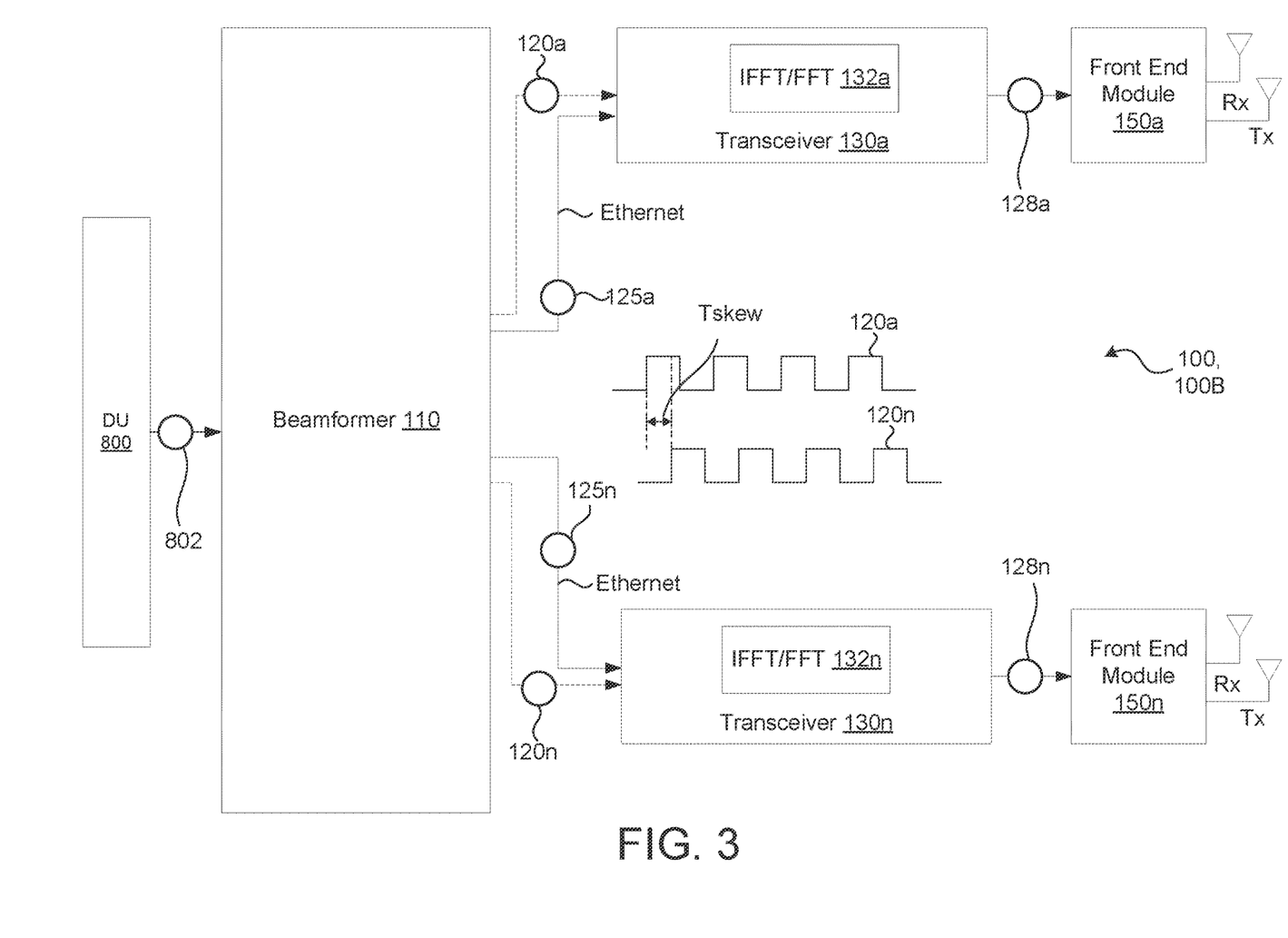
FIG. 3 illustrates a potential timing skew phenomenon created from clock signals transmitted from a beamformer to a plurality of transceivers associated with the example radio unit (RU).

FIG. 3 illustrates a potential timing skew phenomenon (i.e., clock skew) created from clock signals 120, 120a-n transmitted from a beamformer 110 to a plurality of transceivers 130, 130a-n associated with the example radio unit (RU) 100, 100B.

As illustrated in FIG. 3, in some implementations, the beamformer 110 is configured to transmit the clock signals 120a-n (e.g., DEV_CLK 491.52 MHz) to the transceivers 130a-n so all of the transceivers 130a-n are able to operate in a synchronous fashion. In other words, the beamformer 110 may be used to synchronize the transceivers 130a-n. For example, the clock signal 120a is transmitted from the beamformer 110 to the transceiver 130a and the clock signal 120n is transmitted from the beamformer 110 to the transceiver 130n. Based on the clock signals 120a-n, the transceivers 130a-n operate in a synchronous matter that provides a good phase alignment across the antennas (which propagate the outputs of the transceivers 130a-n).

However, in some circumstances, the timing skew Tskew phenomenon in FIG. 3 is created due to wire signal propagation delay. The timing skew (Tskew) may contribute the phase misalignment across the antennas. The present disclosure further provides systems and methods of reducing the timing skew Tskew in FIGS. 4-5.

Figure 4:
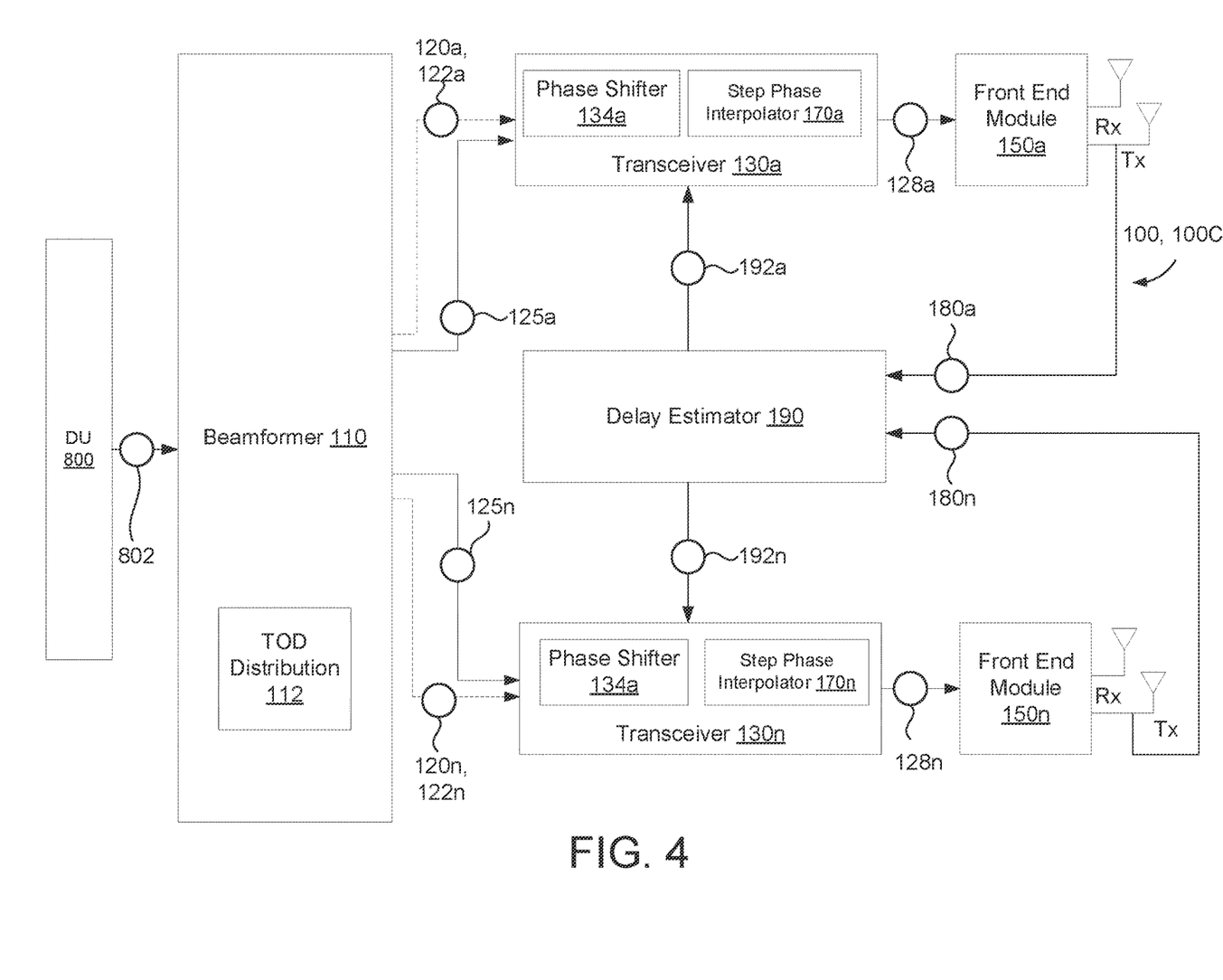
FIG. 4 is a schematic view of an example radio unit (RU) associated with a beamformer, a delay estimator, and a plurality of transceivers.

FIG. 4 is a schematic view of an example radio unit (RU) 100, 100C associated with a beamformer 110, a delay estimator 190, and a plurality of transceivers 130, 130a-n. As illustrated in FIG. 4, in some implementations, the delay estimator 190 associated with the radio unit 100C is configured to receive outputs 180, 180a-n from the front end modules 150a-n. In some implementations, the delay estimator 190 is configured to compare the outputs 180a-n (e.g., clock signals in the output 180a-n) and further configured to transmit phase control signals 192, 192 a-n to the transceivers 130a-n. In some implementations, phase shifters 134a-n associated with the transceivers 130a-n are configured to adjust phase (timing) of the second in-phase and quadrature (I/Q) signals represented in the second domain 128, 128a-n based on the phase control signals 192a-n to reduce the timing skew (Tskew).

In some implementations, to reduce the timing skew (Tskew), a time of day (TOD) distribution module 112, associated with the beamformer 110, is configured to transmit TOD signals 122a-n (over the clock signals 120a-n) at a suitable time (e.g., beginning of the operation or detection of excessive timing skew Tskew). In some implementations, the delay estimator 190 is configured to compare two outputs 180a, 180n generated based on the TOD signals 122a, 122n. In some implementations, the delay estimator 190 is configured to select one output (output 180a in this example) as a reference signal and compare other output signal (output 180n in this example) to the reference signal. Based on the comparison (as referred as "comparison information"), the delay estimator 190 is configured to (generate and) transmit the phase control signal 192 (for example, phase control signal 192n) to the phase shifter 134n associated with the transceiver 130n. In some implementations, this process is repeated until all of the outputs 180b-n (example, seven outputs b-n) is aligned to the output 180a. In this manner, TOD signals 122a, 122n may be distributed to any number of transceivers 130a, 130n using PTP and/or SyncE. The TOD alignment across the transceivers 130a, 130n can be refined using an estimation the delay, such as via the delay estimator 190. In some instances, antenna calibration can be used for the refinement of the TOD alignment across the transceivers 130a, 130n.

Alternatively or additionally, in some implementations, each of the transceivers 130a-n includes a step phase interpolator 170, 170a-n (e.g., 64 step phase interpolator) that allows fine adjustment of the phase of clock signals 120a-n.

Alternatively or additionally, in some implementations, each of the transceivers 130a-n includes a phase ramp module (not shown) configured to adjust timing of the second in-phase and quadrature (I/Q) data represented in the first domain 125a-n prior to the IFFT/FFT module 132a-n based on the comparison information (fractional delay control signal based on the comparison information).

Alternatively or additionally, in some implementations, each of the TOD signals 112a-n distributed by the TOD distribution module 112 is adjusted based on the comparison information. In some implementations, each of clock signals used to generate the TOD signals 112 are adjusted by a coarse delay control module (not shown) based on the comparison information (integer delay control signal based on the comparison information) prior to generating the TOD signals 112.

Alternatively or additionally, in some implementations, prior to the coarse delay control module, the clock signals are adjusted by a fine delay control module/phase interpolator (not shown) based on the comparison information (fractional delay control signal based on the comparison information).

Alternatively or additionally, in some implementations, timing of each second in-phase and quadrature (I/Q) data represented in the second domain 128a-n is adjusted by a filter (e.g., programmable filter) based on the comparison information (fractional delay control signal based on comparison information).

Figure 5:
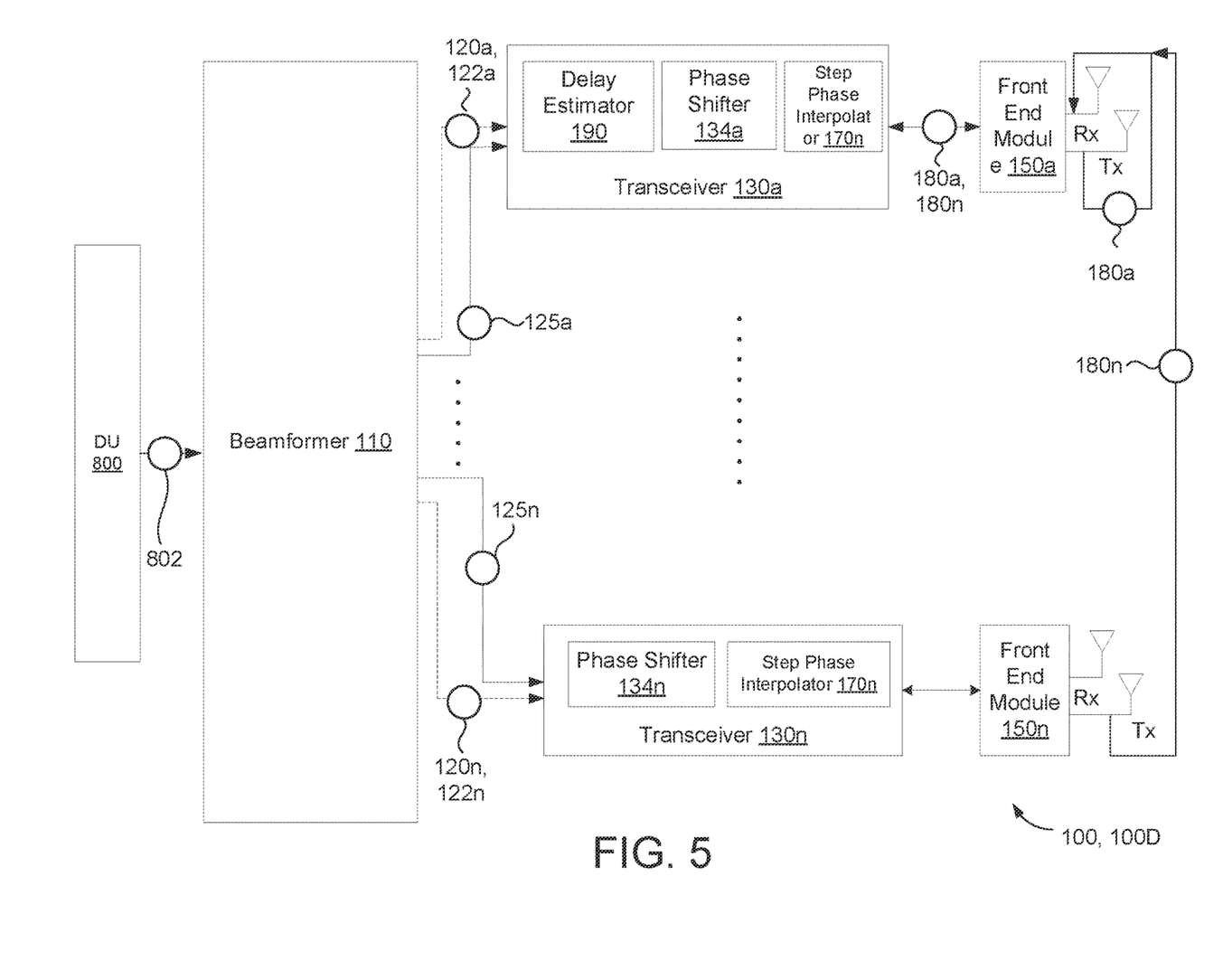
FIG. 5 is a schematic view of an example radio unit (RU) associated with a beamformer, a delay estimator, and a plurality of transceivers.

FIG. 5 is a schematic view of an example radio unit (RU) 100, 100D associated with a beamformer 110, a delay estimator 190, and a plurality of transceivers 130, 130a-n.

As illustrated in FIG. 5, in some implementations, one of the transceivers 130a-n (transceiver 130a in this example) is configured to include the delay estimator 190. As described above, the delay estimator 190 is configured to reduce the timing skew (Tskew) based on the output comparison. Unlike the delay estimator 190 in FIG. 4, the delay estimator 190 in FIG. 5 is configured to receive the outputs 180a-n via the front end module 150a. In some implementations, all of the inputs 180a-n are amplified at the front end module 150a before transmitting to the delay estimator 190 included in the transceiver 130a. In some circumstances, the signal amplification improves the output comparison at the delay estimator 190 in FIG. 5. Since the delay estimator 190 here operates similar to the delay estimator 190 in FIG. 4, the rest of the operations of the delay estimator 190 in FIG. 5 are not repeated here.

Figure 6A:
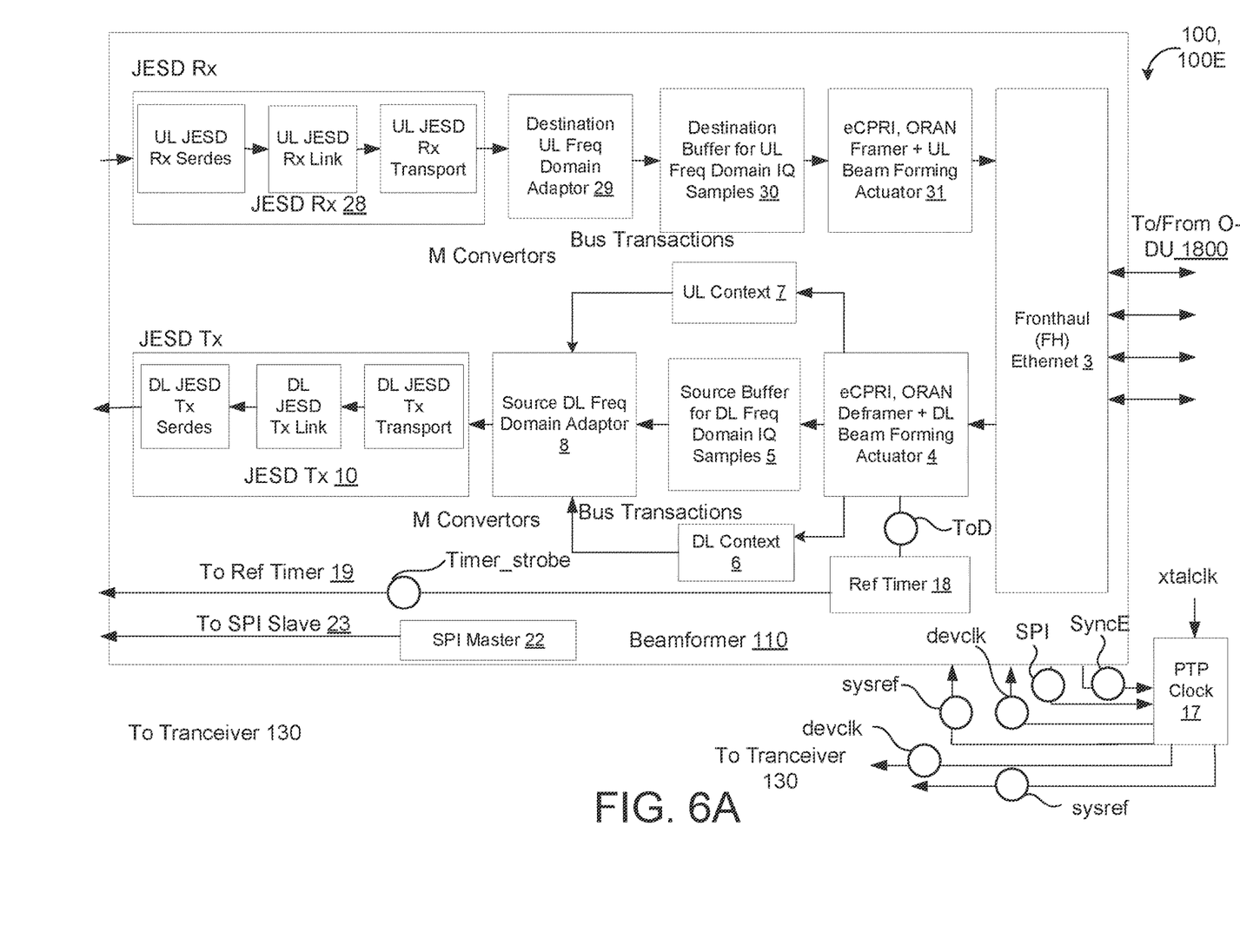
FIGS. 6A and 6B are schematic views of another example radio unit (RU) associated with a beamformer and a transceiver that are configured to work with a JESD standard interface.
Figure 6B:
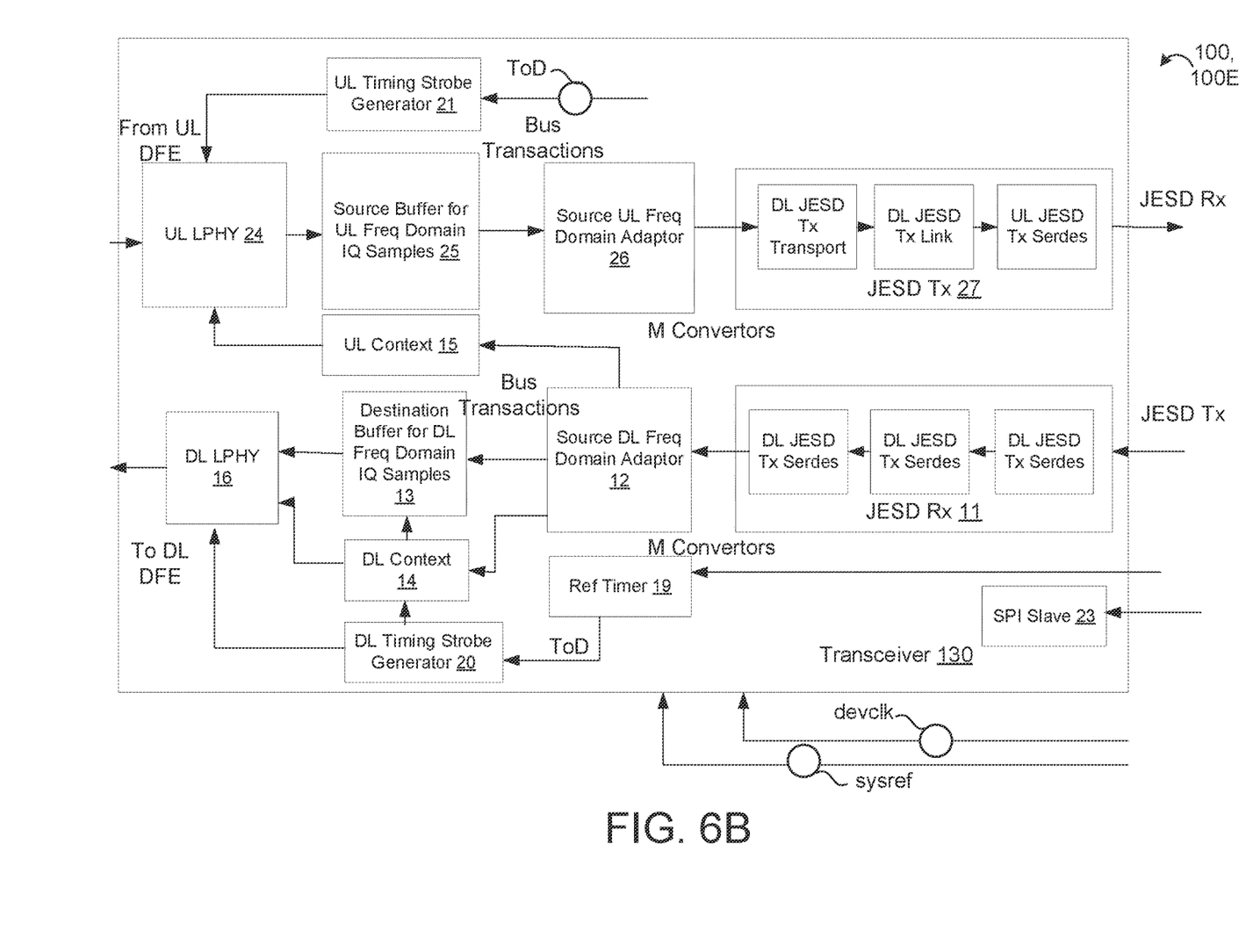

FIGS. 6A and 6B are schematic views of an example radio unit (RU) 100, 100E associated with a beamformer 110 and a transceiver 130 that are configured to work with a JESD standard interface. FIG. 6A illustrates the beamformer 110, and FIG. 6B illustrates the transceiver 130 (configured with LPHY portion).

As illustrated, in some implementations, the radio unit (RU) 100E includes the beamformer 110 and the transceiver 130. In some implementations, the beamformer 110 (e.g., beam forming chip) has data in the form of frequency domain IQ samples and corresponding context information. In some implementations, The beamformer 100 is configured to send these data over a suitable interface standard (JESD204C compliant JESD interface in this example) to the transceiver 130 in a time synchronized manner, such that the transceiver 130 can receive and extract the received frequency domain IQ samples and the context information and then process them (via its LPHY and DFE functional modules) as per the required timing criteria with respect to common synchronized time reference.

The present disclosure provides a method to transfer one or more data/control bus(es) activity in a time synchronized way across the beamformer 110 and the transceiver 130 interconnected over a JESD Tx and Rx interfaces (e.g., JESD204A, JESD204B, JESD204C). The method leverages the mechanisms defined in the JESD standard to embed control information along with data samples on a convertor basis. The bits of bus whose activity needs to be sent across is mapped to M convertors. Information corresponding to the different phases of the bus (e.g. control activity and data transfer activity) is mapped to the M convertors and the phases are encoded in the control bits. The M convertors whether they are carrying control activity or data transfer is indicated by control bits. The exact mapping for a given bus, its control activity and data transfer activity to control and data sample bits is implementation specific.

The beamformer 110 and the transceiver 130 may operate off the same device clock and use sys_ref signal to synchronize JESD operation as per JESD standard.

The beamformer 110 may include a fronthaul Ethernet interface 3 to receive Ethernet packets as per O-RAN standard from O-DU 1800. These packets may contain frequency domain IQ samples as well as control information in terms of beam forming weights. These packets also may include timing information on when those IQ samples are to be transmitted on air (antenna) or in the receive direction when the samples are expected to be received from UE at the antenna.

The received packets may be processed by the evolved common public radio interface (eCPRI), ORAN deframer module 4. For the downlink direction, this module extracts the IQ buffer samples, beam forming weights and processes the samples as per the functionality of beam forming actuator. The processed samples are sent to Source DL Frequency Domain IQ Sample Buffer 5. It also extracts DL Context information extracted from C plane packets and stores it in DL Context memory 6. It also extracts UL Context information extracted from C plane packets and stores it in UL Context memory 7.

The Source DL Frequency Domain IQ Sample Buffer 5 may include a set of buffers one per symbol. There is one buffer for a given end point or eAxCID (as defined in O-RAN standard) for each slot and symbol. Slot and symbol reference are temporal, and range of slot and symbol buffer concurrently maintained is implementation specific.

The DL Context memory 6 and UL Context memory 7 too may be organized on a symbol, slot and eAxCID basis.

Content of 5, 6, 7 are read by DL Frequency Domain Adaptor 8. Its basic unit of transfer is information corresponding to a context. The context address is defined by a combination of {eAxCID, Slot and symbol}. For DL, each transfer may include Context Header followed by frequency domain IQ samples for that context. For UL, the transfer may include Context Header alone.

The context header for DL may include Context Address, DL Context information and for UL it may include Context Address and UL Context information.

DL Frequency Domain Adaptor 8 reads and transfers the DL and UL information as per schedule corresponding to that symbol. The schedule is referenced to the Time of Day (ToD) provided by Reference Time 18.

DL Frequency Domain Adaptor 8 maps the Context header and the frequency domain IQ samples into M convertors and their control bits as per JESD standard. The mapped convertor data is provided to JESD Tx Transport module that is part of the JESD Tx 10.

JESD Tx 10 is connected to JESD Rx interface 11 of the transceiver 130. The JESD Rx transport module will extract the M convertor data and send it to Destination DL Freq Domain Adaptor 12.

Destination DL Frequency Domain Adaptor 12 does the reverse mapping of M convertor data to the corresponding Context Header and DL frequency domain IQ samples. It then writes the DL context data to DL Context memory 14, UL context data to UL Context memory 15 and DL frequency domain IQ samples to destination DL frequency domain IQ sample buffer 13.

DL LPHY 16, implements the Low PHY functionality as per O-RAN standard. It reads the DL frequency domain IQ sample from 13 and DL Context data from 14 when it receives the appropriate timing strobes from DL Timing Strobe Generator 20. It processes the frequency domain samples, performs IFFT and then forwards the time domain IQ samples to DL DFE data path modules for further processing.

The DL Timing Strobe Generator 20 generates the timing strobes by using the ToD provided by the local Reference Timer 19.

Reference Timer 19 provide ToD that is synchronized to the ToD maintained in 18. The Reference Timer 18 provides a timer_strobe signal to Reference Timer 19. The timer_strobe is used to load a pre-programmed ToD value in 19 at the rising edge of timer_strobe. The programming is performed by the beamformer 110 by using its SPI Master interface 22 to talk to SPI slave interface 23 of the transceiver 130.

In the UL path, the UL LPHY 24 receives time domain IQ samples from UL DFE data path (not shown in the figure) and performs FFT to convert them to UL frequency domain IQ samples. The FFT is performed by UL LPHY when it receives timing strobes from UL Timing Strobe Generator 21. The UL Timing Strobe Generator generates the timing strobes by using the ToD provided by the local Reference Timer 19. UL LPHY also uses the UL context information from UL Context memory 15.

The UL frequency domain samples produced by UL LPHY 24 are stored in Source Buffer for UL frequency domain IQ samples 25. These may include a set of buffers one per symbol. There is one buffer for a given end point or eAxCID (as defined in O-RAN standard) for each slot and symbol. Slot and symbol reference are temporal, and range of slot and symbol buffer concurrently maintained is implementation specific.

Source UL Frequency Domain Adaptor 26 reads these UL frequency domain IQ samples from a specific buffer addressed by {eAxCID, Slot and symbol}, the UL context address. It sends the context address followed by the frequency domain IQ samples corresponding to that context. UL Frequency Domain Adaptor 26 maps the Context header and the frequency domain IQ samples into M convertors and their control bits as per JESD standard. The mapped convertor data is provided to JESD Tx Transport module that is part of the JESD Tx 27.

JESD Tx 27 is connected to JESD Rx interface 28 of the beamformer 110. The JESD Rx transport module may extract the M convertor data and send it to Destination UL Frequency Domain Adaptor 29.

Destination UL Frequency Domain Adaptor 29 does the reverse mapping of M convertor data to the corresponding Context Header and UL frequency domain IQ samples. It then writes the UL frequency domain IQ samples to the buffer addressed by the UL context address in the destination UL frequency domain IQ sample buffer 30.

The UL frequency domain IQ samples are read by eCPRI, O-RAN framer 31 and it processes them through beam forming actuator, creates packets with suitable eCPRI and O-RAN framing information and then sends it over FH Ethernet to O-DU via Fronthaul Ethernet module 3.

The reference timer 18 in the beamformer 110 is synchronized to the network time using S plane packets and applicable 1588, G.8275 protocol. This requires usage of PTP clock chip 17 to ensure frequency lock using SyncE signal and phase lock as per PTP protocol. The clock chip in turn generates the dev_clk and sys_ref that are synchronized to the network time and are fed to the beamformer 110 and transceiver 130 to ensure both operate with same time reference.

The SPI Slave 23 in the transceiver 130 is also used to program all other registers, memories in the transceiver 130 by the beamformer 130.

Note while we have illustrated how the method can be used to transfer frequency domain IQ samples in a synchronized manned between the beamformer 110 and transceiver 130, the method is extensible to carry any other bus activity or information from one chip to another in a time synchronized manner by modifying the source and destination adaptor modules suitably without limitations.

In some implementations, a synchronous interface (e.g., what may be used for time domain data transfer) may be used to transfer the frequency domain data. In some implementations, a predefined protocol may allow the DFE and one or more radio units to exchange data using the synchronous link. The serial link data framing be configured to manage the control data, the I/Q data, and the context data where the context is defined as the destination antenna. In some implementations, a data buffer may be used in the radio unit to convert bursty frequency domain packets to be streamed out using the synchronous interface. In some implementations, a timing reference signal that may be similar to the timing reference signal in the time domain interface may be used as an initial timing reference.

Figure 7:
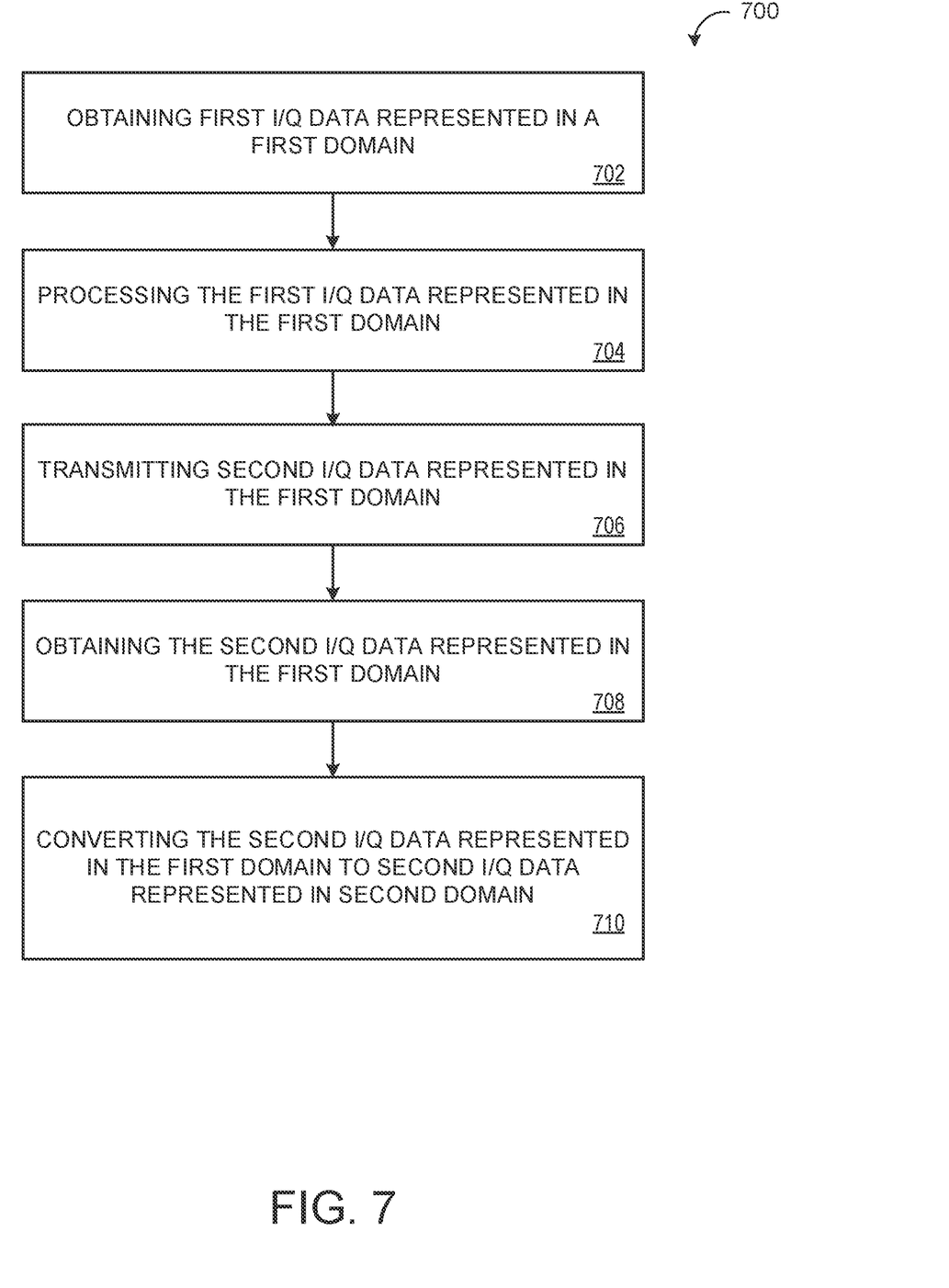
FIG. 7 is a flowchart of an example arrangement of operations for a method of transmitting in-phase and quadrature (I/Q) data from a beamformer to a transceiver.

FIG. 7 is a flowchart of an example arrangement of operations for a method 700 of transmitting in-phase and quadrature (I/Q) data from a beamformer 110 to a transceiver 130. The method 700 may be performed by processing logic that may include hardware (circuitry, dedicated logic, etc.), software (such as is run on a general purpose computer system or a dedicated machine), or a combination of both, which processing logic may be included in any computer system or device. For simplicity of explanation, methods described herein are depicted and described as a series of acts. However, acts in accordance with this disclosure may occur in various orders and/or concurrently, and with other acts not presented and described herein. Further, not all illustrated acts may be used to implement the methods in accordance with the disclosed subject matter. In addition, those skilled in the art will understand and appreciate that the methods may alternatively be represented as a series of interrelated states via a state diagram or events. Additionally, the methods disclosed in this specification are capable of being stored on an article of manufacture, such as a non-transitory computer-readable medium, to facilitate transporting and transferring such methods to computing devices. The term article of manufacture, as used herein, is intended to encompass a computer program accessible from any computer-readable device or storage media. Although illustrated as discrete blocks, various blocks may be divided into additional blocks, combined into fewer blocks, or eliminated, depending on the desired implementation.

The method, at operation 702, includes obtaining or receiving, the first in-phase and quadrature (I/Q) data represented in a first domain from a distributed unit (DU). As discussed above, the beamformer 110 is configured to receive the first in-phase and quadrature (I/Q) data represented in the first domain.

At operation 704, the method 700 includes, processing the first in-phase and quadrature (I/Q) data represented in the first domain. As discussed above, the beamformer 110 is configured to process the first in-phase and quadrature (I/Q) data represented in the first domain with a data compression scheme. For example, the data compression scheme includes at least one open radio access network (O-RAN) compression scheme.

At operation 706, the method 700 includes, transmitting second in-phase and quadrature (I/Q) data represented in the first domain. As discussed above, the beamformer 110 is configured to transmit second in-phase and quadrature (I/Q) data represented in the first domain based on the processed first in-phase and quadrature (I/Q) data in the first domain. In some implementations, the second in-phase and quadrature (I/Q) data is transmitted to the transceiver 130 based on an Ethernet standard or JESD standard (e.g., JDSE204C).

At operation 708, the method 700 includes, obtaining or receiving the second in-phase and quadrature (I/Q) data represented in the first domain. As discussed the transceiver 130 is configured to receive the second in-phase and quadrature (I/Q) data represented in the first domain.

At operation 710, the method 700 includes, converting the second in-phase and quadrature (I/Q) data represented in the first domain to second in-phase and quadrature (I/Q) data represented in the second domain. As discussed above, the transceiver 130 is configured to convert the second in-phase and quadrature (I/Q) data represented in the first domain (frequency domain in this example) to second in-phase and quadrature (I/Q) data represented in the second domain (time domain in this example).

A number of implementations have been described. Nevertheless, it will be understood that various modifications may be made without departing from the spirit and scope of the disclosure. Accordingly, other implementations are within the scope of the following claims.

In accordance with common practice, the various features illustrated in the drawings may not be drawn to scale. The illustrations presented in the present disclosure are not meant to be actual views of any particular apparatus (e.g., device, system, etc.) or method, but are merely idealized representations that are employed to describe various embodiments of the disclosure. Accordingly, the dimensions of the various features may be arbitrarily expanded or reduced for clarity. In addition, some of the drawings may be simplified for clarity. Thus, the drawings may not depict all of the components of a given apparatus (e.g., device) or all operations of a particular method.

Terms used herein and especially in the appended claims (e.g., bodies of the appended claims) are generally intended as "open" terms (e.g., the term "including" should be interpreted as "including, but not limited to," the term "having" should be interpreted as "having at least," the term "includes" should be interpreted as "includes, but is not limited to," etc.).

Additionally, if a specific number of an introduced claim recitation is intended, such an intent will be explicitly recited in the claim, and in the absence of such recitation no such intent is present. For example, as an aid to understanding, the following appended claims may contain usage of the introductory phrases "at least one" and "one or more" to introduce claim recitations. However, the use of such phrases should not be construed to imply that the introduction of a claim recitation by the indefinite articles "a" or "an" limits any particular claim containing such introduced claim recitation to embodiments containing only one such recitation, even when the same claim includes the introductory phrases "one or more" or "at least one" and indefinite articles such as "a" or "an" (e.g., "a" and/or "an" should be interpreted to mean "at least one" or "one or more"); the same holds true for the use of definite articles used to introduce claim recitations.

In addition, even if a specific number of an introduced claim recitation is explicitly recited, it is understood that such recitation should be interpreted to mean at least the recited number (e.g., the bare recitation of "two recitations," without other modifiers, means at least two recitations, or two or more recitations). Furthermore, in those instances where a convention analogous to "at least one of A, B, and C, etc." or "one or more of A, B, and C, etc." is used, in general such a construction is intended to include A alone, B alone, C alone, A and B together, A and C together, B and C together, or A, B, and C together, etc. For example, the use of the term "and/or" is intended to be construed in this manner.

Further, any disjunctive word or phrase presenting two or more alternative terms, whether in the description, claims, or drawings, should be understood to contemplate the possibilities of including one of the terms, either of the terms, or both terms. For example, the phrase "A or B" should be understood to include the possibilities of "A" or "B" or "A and B."

Additionally, the use of the terms "first," "second," "third," etc., are not necessarily used herein to connote a specific order or number of elements. Generally, the terms "first," "second," "third," etc., are used to distinguish between different elements as generic identifiers. Absence a showing that the terms "first," "second," "third," etc., connote a specific order, these terms should not be understood to connote a specific order. Furthermore, absence a showing that the terms first," "second," "third," etc., connote a specific number of elements, these terms should not be understood to connote a specific number of elements. For example, a first widget may be described as having a first side and a second widget may be described as having a second side. The use of the term "second side" with respect to the second widget may be to distinguish such side of the second widget from the "first side" of the first widget and not to connote that the second widget has two sides.

All examples and conditional language recited herein are intended for pedagogical objects to aid the reader in understanding the invention and the concepts contributed by the inventor to furthering the art, and are to be construed as being without limitation to such specifically recited examples and conditions. Although embodiments of the present disclosure have been described in detail, it should be understood that the various changes, substitutions, and alterations could be made hereto without departing from the spirit and scope of the present disclosure.

What is claimed is:

1. A system for a radio access network (RAN), comprising:
 a radio unit (RU) configured to receive first in-phase and quadrature (I/Q) data represented in a first domain from a distributed unit (DU);
 a beamformer associated with the RU, the beamformer configured to:
  receive the first I/Q data represented in the first domain, and
  transmit second I/Q data represented in the first domain based on the first I/Q data in the first domain,
 a transceiver associated with the RU, the transceiver configured to:

receive the second I/Q data represented in the first domain, and
convert the second I/Q data represented in the first domain to second I/Q data represented in a second domain,
a first front end module (FEM) configured to generate a first output signal based on the second I/Q data represented in the second domain,
a second FEM configured to generate a second output signal, and
a delay estimator configured to:
compare the first output and the second output, and
determine a time delay between the first output and the second output.

2. The system of claim 1, wherein the first domain is a frequency domain.

3. The system of claim 1, wherein the first I/Q data in the first domain and the second I/Q data in the first domain are the same.

4. The system of claim 1, wherein the beamformer is configured to:
process the first I/Q data represented in the first domain with a data compression scheme.

5. The system of claim 4, wherein the data compression scheme includes at least one open radio access network (O-RAN) compression scheme.

6. The system of claim 1, wherein the beamformer and the transceiver are further configured such that the second I/Q data represented in the first domain is transmitted from the beamformer to the transceiver based on an Ethernet standard.

7. The system of claim 1, wherein the beamformer and the transceiver are further configured such that the second I/Q data represented in the first domain is transmitted from the beamformer to the transceiver based on a JESD standard.

8. The system of claim 1, wherein the transceiver includes an inverse fast fourier transform (IFFT) module configured to convert the second I/Q data represented in the first domain to the second I/Q data represented in the second domain.

9. The system of claim 1, wherein: the RU is an open radio unit (O-RU).

10. The system of claim 1, wherein the DU is an open distributed unit (O-DU).

11. A system for a radio access network (RAN), comprising:
a radio unit (RU) configured to receive a first in-phase and quadrature (I/Q) signal represented in a first domain from a distributed unit (DU);
a beamformer associated with the RU, the beamformer configured to:
receive the first I/Q signal represented in the first domain, and
transmit a plurality of second I/Q signals represented in the first domain based on the first I/Q signal represented in the first domain, the plurality of second I/Q signals represented in the first domain including a #1 second I/Q signal represented in the first domain and a #2 second I/Q signal represented in the first domain,
a plurality of transceivers associated with the TU, the plurality of transceivers including a first transceiver and a second transceiver,
wherein the first transceiver is configured to:
receive the #1 second I/Q signal represented in the first domain, and
convert the #1 second I/Q data represented in the first domain to a #1 second I/Q data represented in a second domain, and
wherein the second transceiver is configured to:
receive the #2 second I/Q signal represented in the first domain, and
convert the #2 second I/Q data represented in the first domain to a #2 second I/Q data represented in the second domain,
a first front end module (FEM) configured to generate a first output signal based on the #1 second I/Q data represented in the second domain,
a second FEM configured to generate a second output signal based on #2 second I/Q data represented in the second domain, and
a delay estimator configured to:
compare the first output and the second output, and
determine a time delay between the first output and the second output.

12. The system of claim 11, wherein the first domain is a frequency domain.

13. The system of claim 11, wherein the beamformer is configured to:
process the first I/Q signal represented in the first domain with a signal compression scheme.

14. The system of claim 13, wherein the signal compression scheme includes at least one of open radio access network (O-RAN) compression schemes.

15. The system of claim 11, wherein the beamformer and the first transceiver are further configured such that the #1 second I/Q signal represented in the first domain is transmitted from the beamformer to the first transceiver based on an Ethernet standard, and wherein the beamformer and the second transceiver are further configured such that the #2 second I/Q signal represented in the first domain is transmitted from the beamformer to the second transceiver based on the Ethernet standard.

16. The system of claim 11, wherein the beamformer and the first transceiver are further configured such that the #1 second I/Q signal represented in the first domain is transmitted from the beamformer to the first transceiver based on a JESD standard, and wherein the beamformer and the second transceiver are further configured such that the #2 second I/Q signal represented in the first domain is transmitted from the beamformer to the second transceiver based on the JESD standard.

17. The system of claim 11, wherein the first transceiver includes a first inverse fast fourier transform (IFFT) module configured to convert the #1 second I/Q signal represented in the first domain to the #1 second I/Q signal represented in the second domain, and wherein the second transceiver includes a second IFFT module configured to convert the #2 second I/Q signal represented in the first domain to the #2 second I/Q signal represented in the second domain.

18. The system of claim 1, wherein the beamformer is configured to provide a synchronization of the transceiver and a second transceiver.

19. The system of claim 11, wherein the beamformer is configured to provide a synchronization of the first transceiver and the second transceiver.

* * * * *